United States Patent [19]

McKeown et al.

[11] Patent Number: 5,078,473
[45] Date of Patent: Jan. 7, 1992

[54] PYRAMID BEAM SPLITTER

[75] Inventors: Mark H. McKeown, Golden; Steven C. Beason, Lakewood; George Fairer, Boulder, all of Colo.

[73] Assignee: The United States of America as represented by the Secretary of the Interior, Washington, D.C.

[21] Appl. No.: 327,930

[22] Filed: Mar. 23, 1989

[51] Int. Cl.$^5$ .............................................. G02B 7/18
[52] U.S. Cl. ........................................ 359/618; 359/834
[58] Field of Search ............... 350/171, 173, 174, 169, 350/616, 632, 287, 286

[56] References Cited

U.S. PATENT DOCUMENTS 3,622,232 11/1971 Munnerlyn ........................ 350/287
3,726,600 4/1973 Carmack et al. .................. 350/171
3,820,903 6/1974 Kindl et al. ....................... 350/171

Primary Examiner—Bruce Y. Arnold
Assistant Examiner—Rebecca D. Gass
Attorney, Agent, or Firm—E. Philip Koltos

[57] ABSTRACT

The apparatus of the present invention provides means for obtaining accurate, dependable, measurement of bearings and directions for geologic mapping in subterranean shafts, such as, for example, nuclear waste storage investigations. In operation, a laser beam is projected along a reference bearing. A pyramid is mounted such that the laser beam is parallel to the pyramid axis and can impinge on the apex of the pyramid thus splitting the beam several ways into several beams at right angles to each other and at right angles to the reference beam. The pyramid is also translatable and rotatable in a plane perpendicular to the reference beam.

4 Claims, 1 Drawing Sheet

PYRAMID BEAM SPLITTER

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION

This invention relates generally to a pyramid beam splitter which permits the multiple split and precise right angle deflection of a laser beam. It also allows for a single beam right angle deflection. Any split or deflection direction is selectable.

Accurate, dependable measurement of bearings and directions are required for geologic mapping in subterranean shafts, such as, for example, nuclear waste storage investigations. A method of decreasing survey time (and therefore costs) while retaining accuracy and quality was needed. The time required to survey target locations is a major factor in the cost of geologic mapping for nuclear waste storage investigations. Also the quality assurance of the data is a major consideration. Previous methods consisted of conventional surveying (manually determining distances and angles) or, if using a laser distance-measuring device, manually measuring the angles.

Subterranean sites presently being investigated are in rock with natural magnetism and also contain steel structures. Previously, mapping of shafts could be done with extensive survey support to give geologists reference angles from which to measure the angles of the geologic features. Under these conditions, a surveyed reference (strike rail), is necessary with all directions or bearings related to the reference. Utilizing a conventional strike rail is time consuming and therefore extremely expensive. Previous methods consisted of obtaining bearings or directions from surveyed rails that had to be prepositioned around the periphery of the work platform. Magnetic compasses have been used but are not dependable.

Prior art devices such as disclosed in U.S. Pat. No. 2,579,067 to Cunningham, disclose some form of beam splitters/deflectors and U.S. Pat. No. 4,523,809 discloses a laser beam and a four facet pyramid prism. Other prior art devices such as disclosed in U.S. Pat. No. 4,150,897 to Roberts, disclose a laser which provides a laser beam to a rotating pyramid mounted forwardly and arranged to be continuously rotated. Mounted between the rotating pyramid and the lens is a movable pyramid. Neither these nor other prior art devices found disclose precise mechanical adjustment of the beam splitter as disclosed by the instant invention which overcomes the deficiencies of the prior art by the use of a pyramid beam splitter/deflector which is laterally translatable and radially adjustable.

SUMMARY OF THE INVENTION

It is therefore an object of the present invention to provide a scanning type multiple split and precise right-angle deflection of a laser beam to permit precise location of reference points at the positions the beams intersect a surface (e.g. a shaft or tunnel wall).

It is a further object to eliminate the need to turn angles when surveying and/or positioning target locations.

It is a still further object to reduce the time required to survey locations in three dimensions.

Another object of the present invention is to reduce error and improve quality assurance in surveying and geologic mapping.

The foregoing objects and other objects of the present invention will become apparent and understandable from the following description thereof, when read in conjunction with the accompanying drawings.

DESCRIPTION OF THE PREFERRED EMBODIMENT

Figure 1:
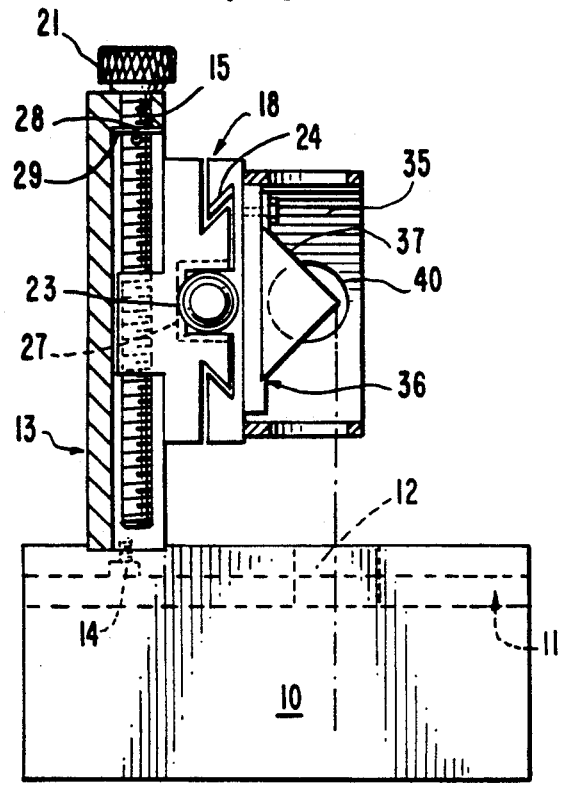
FIG. 1 is a side view, partially in section, of a pyramid beam splitter with improved means to permit multiple split and precise right-angle deflection of a laser beam.

For the purposes of promoting an understanding of the principles of this invention, reference will now be made to the embodiment illustrated in the drawings. It will be understood that no limitation of the scope of this invention is thereby intended, such options and further modifications in the illustrated system, and such further applications of the principles of this invention as illustrated therein being contemplated as would normally occur to one skilled in the art which this invention relates to.

Figure 2:
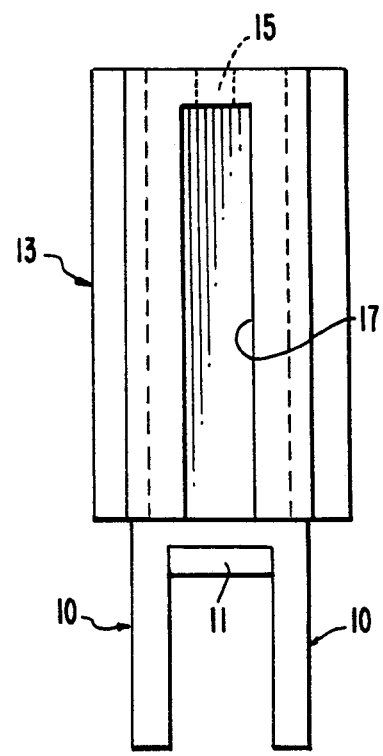
FIG. 2 is a front view of the base and channel.
Figure 3:
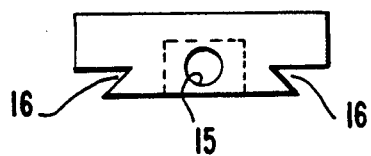
FIG. 3 is a top view of a base.
Figure 4:
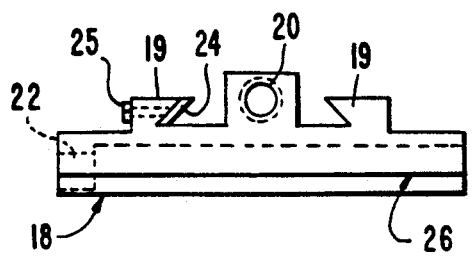
FIG. 4 is a top view of a vertical slide.
Figure 5:
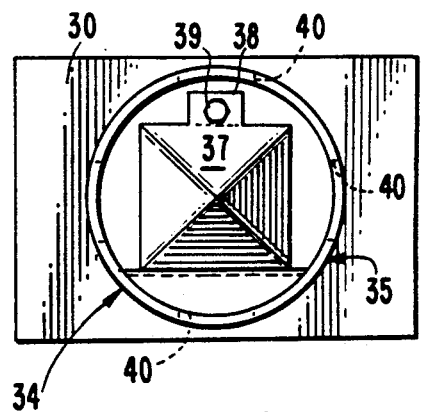
FIG. 5 is a front view of a horizontal slide.
Figure 6:
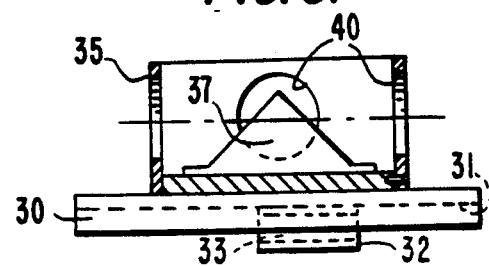
FIG. 6 is a top view of a horizontal slide showing the prism mount and guard.

Referring to FIGS. 1 and 2, there is illustrated the optical layout of the pyramid beam splitter (pyramid) of the present invention. The pyramid beam splitter may be mounted on a standard survey tripod, photographic tripod, or a reference rail using an appropriate adapter (not shown) as needed. Numeral 10 designates a channel made of any suitable material such as steel, adapted to be mounted on an appropriate stand, as for example, a reference rail. A low friction material, such as Teflon, may be used as a bearing 11 to reduce sliding friction as the channel is moved across the reference rail. An opening 12 is created in the upper surface of channel 10 to permit a reflected laser beam to be reflected in a fourth direction.

A base 13 is attached to channel 10 with screws 14 as shown in FIG. 1. Hole 15 is formed in the top surface of base 13 and grooves 16 are formed in the front face of base 13. An internal slot 17 provides a path for mating members to follow as described below. Slide 18 contains flanges 19 on its reverse side which are adapted to mate with grooves 16 in base 13 when they are assembled together. Threaded hole 20 is provided in the top of slide 18 to accept vertical adjusting screw 21 and clearance hole 22 is provided for horizontal adjusting screw 23. A low friction material guide 24 is fastened to the interior face of left flange 19 by screws 25 to provide for a closer sliding fit.

Slide 18 contains transverse grooves 26 and slot 27 in the front face to provide a mating fit as described below. Slide 18 is then assembled with base 13 and vertical adjusting screw 21 is inserted into hole 15 and a locking pin 28 and washer 29 are provided to retain the screw 21 in place. Screw 21 is then threaded into threaded hole 20 of slide 18.

After assembly of the vertical slide 18, it then is used as the base for slide 30 which contains grooves 31, flange 32 and threaded hole 33 which provide the same functions as their counterparts on slide 18. Slide 30 is then assembled with slide 18 and horizontal adjusting screw 23 is inserted in hole 22 and a locking pin 28 and washer 29 are provided to retain the screw 23 in place. Screw 23 is then threaded into threaded hole 33 of slide 30.

Base 34 is mounted on slide 30 with a shoulder screw (not shown), and prism guard cover 35 is fastened thereto. A groove 36 is cut into base 34 to accept one edge of the pyramid 37 and a small plate 38 and screw 39 are adapted on the opposite side to hold the prism 37 firmly to the base 34. Holes 40 are cut on the sides facing each face of the pyramid to expose the pyramid to the laser beams. The cover 35 may be made from a thin walled tubing of aluminum or brass or other suitable material.

The theory of operation is based on the precise angles attainable by constructing a reflecting pyramid to close tolerances. The pyramid consists of a glass (or other suitable material) pyramid first-surface coated to reflect light. The number and direction of the beam reflections is fully selectable within the possible directions depending on the number of faces on the pyramid. For illustration purposes, a pyramid which has four faces oriented 90 degrees from each other measured in a plane perpendicular to the axis and 45 degrees from the axis of the pyramid is described. The instant invention is not limited to this number of faces or configuration.

In operation, a laser beam is projected along a reference bearing. The pyramid is mounted such that the laser beam is parallel to the pyramid axis and can impinge on the apex of the pyramid thus splitting the beam four ways into four beams at right angles to each other and at right angles to the reference beam. The pyramid is also translatable in a plane perpendicular to the reference beam by adjusting screws 21 and 23 to move the dovetailed slides 18 and 30, thus allowing one, two, or four faces of the pyramid to intersect the beam and deflect the entire beam or split the beam into two beams or four beams respectively The number and direction of the beam reflection is fully selectable within the possible four directions depending on the position of the pyramid. The pyramid can be mounted on a rotating base attached to the dovetailed slide to permit projection of the beam(s) anywhere in a plane. If more splits or reflection directions are required, a pyramid with the appropriate number of faces may be used.

The pyramid beam splitter may be mounted on a standard survey tripod, photographic tripod, or a reference rail. The beam reflected toward the mount can pass through a hole in the mount (and/or adapter and tripod) to a monument or reference point and be used to orient and locate the pyramid beam splitter. If a reference rail is located parallel to the reference beam, the instant invention can then be moved coincident with the beam along the rail allowing the projection of the split or deflected beams onto the desired surface the entire length of the rail.

Although the best modes contemplated for carrying out the present invention have been herein shown and described, it will be apparent that modification and variation may be made without departing from what is regarded to be the subject matter of the invention a defined in the appended claims.

What is claimed is:

1. Apparatus for providing a measure of horizontal and vertical angles for geologic mapping by splitting and deflecting a laser beam, the invention comprising:
   support means;
   vertical adjusting means slideably mounted on said support means having a base, a slide dovetailed to said base, and an adjusting screw adapted to move said slide vertically on said support means;
   horizontal adjusting means slideably mounted on said vertical adjusting means; and
   beam splitting and deflecting means mounted on said horizontal adjusting means adapted to permit projection of said laser beam anywhere in a plane.

2. An apparatus as recited in claim 1 wherein said horizontal adjusting means comprises
   said vertical adjusting means,
   a slide dovetailed to said vertical adjusting means and adapted to move said slide horizontally on said vertical adjusting means.

3. An apparatus as recited in claim 1 wherein said beam splitting and deflecting means comprises a pyramid which has a plurality of faces oriented 90 degrees from each other measured in a plane perpendicular to the axis and 45 degrees from the axis.

4. Apparatus for providing a measure of horizontal and vertical angles for geologic mapping by splitting and deflecting a laser beam, the invention comprising:
   a base mounted on a channel and adapted to slide on a reference rail,
   a first slide dovetailed to said base and having an adjusting screw adapted to move said first slide vertically on said base,
   a second slide dovetailed to said first slide and having an adjusting screw adapted to move said second slide horizontally on said first slide, and
   a rotatable pyramid having at least four faces oriented 90 degrees from each other measured in a plane perpendicular to the axis and 45 degrees from the axis adapted to permit projection of said laser beam anywhere in a plane.

* * * * *